(12) United States Patent
Greening et al.

(10) Patent No.: US 7,515,271 B2
(45) Date of Patent: Apr. 7, 2009

(54) WAVELENGTH CALIBRATION IN A FIBER OPTIC GYROSCOPE

(75) Inventors: Thomas C. Greening, Peoria, AZ (US); Scott A. Anson, Iowa City, IA (US)

(73) Assignee: Honeywell International Inc., Morristown, NJ (US)

( * ) Notice: Subject to any disclaimer, the term of this patent is extended or adjusted under 35 U.S.C. 154(b) by 270 days.

(21) Appl. No.: 11/397,504

(22) Filed: Apr. 3, 2006

(65) Prior Publication Data

US 2007/0229838 A1 Oct. 4, 2007

(51) Int. Cl.
*G01C 19/72* (2006.01)

(52) U.S. Cl. ........................... 356/463; 356/464
(58) Field of Classification Search ................. 356/463, 356/464, 470
See application file for complete search history.

(56) References Cited

U.S. PATENT DOCUMENTS

| | | | |
|---|---|---|---|
| 5,208,819 A * | 5/1993 | Huber | 372/32 |
| 5,684,590 A | 11/1997 | Sanders et al. | |
| 5,812,263 A | 9/1998 | Morgan | |
| 5,926,275 A | 7/1999 | Sanders et al. | |
| 6,002,481 A | 12/1999 | Bielas et al. | |
| 6,373,048 B1 * | 4/2002 | Tschanun | 356/464 |
| 6,744,793 B2 | 6/2004 | Stoner et al. | |
| 2005/0191008 A1 * | 9/2005 | Anson et al. | 356/460 |
| 2007/0097374 A1 * | 5/2007 | Ren-Young | 356/460 |

* cited by examiner

*Primary Examiner*—Patrick J Connolly
(74) *Attorney, Agent, or Firm*—Black Lowe & Graham PLLC

(57) ABSTRACT

Methods and apparatus are provided for calibrating a fiber optic gyroscope (FOG) to compensate for wavelength fluctuations. The wavelength of the light propagating in the gyroscope is accurately determined by obtaining wavelength indicia for light originally produced by the sensor light source and for light produced by a reference light source. The wavelength indicia may include normalized power values, such as sum and difference indicia, obtained from two outputs of a wavelength division multiplexer. Such information can be used to determine the wavelength of light produced by the sensor light source, and to adjust a scale factor or other operating parameter of the gyroscope as a function of the determined wavelength. This adjustment, in turn, can be used to compensate the output of the sensor to account for wavelength variations.

18 Claims, 3 Drawing Sheets

WAVELENGTH CALIBRATION IN A FIBER OPTIC GYROSCOPE

TECHNICAL FIELD

The present invention generally relates to fiber optic gyroscopes, and more particularly relates to techniques and structures for compensating the output of a fiber optic gyroscope in response to wavelength variations.

BACKGROUND

For many years, fiber optic gyroscopes have been used in guidance and navigation systems for aircraft, satellites, missiles, watercraft and other moving objects. Fiber optic gyroscopes typically utilize two beams of light that rotate in opposite directions around a coil of optical fiber. As the coil rotates, the propagation of the light beams within the fiber varies according to the well-known Sagnac Effect. By sensing relative changes in the phase of the two counter-rotating light beams within the coil, then, the rotation of the coil itself can be detected with a very high level of accuracy. This rotation of the coil can be readily correlated to rotation of a vehicle, missile or other object.

Gyroscopes frequently operate in highly demanding environments (e.g. aerospace or battlefield settings) that can require very high levels of performance even in the face of radiation, extreme temperature variances, electromagnetic noise and/or other environmental effects. Radiation and temperature variations, for example, are known to affect the stability of the mean wavelength of light exiting the gyroscope, which is proportional to the measured rate of rotation. Scientists and engineers therefore continually strive to reduce sensitivity to wavelength fluctuations and to otherwise improve the performance, resolution and manufacturability of fiber optic gyroscopes, particularly those deployed in highly demanding environments.

Accordingly, it is desirable to provide a fiber optic gyroscope and associated operating methods with improved performance. In particular, it is desirable to reduce sensitivity to variations in source wavelength. Other desirable features and characteristics will become apparent from the subsequent detailed description of the invention and the appended claims, taken in conjunction with the accompanying drawings and this background of the invention.

BRIEF SUMMARY

Methods and apparatus are provided for compensating the output of a fiber optic gyroscope in response to changes in source light wavelength. Changes in the source wavelength can be accurately measured using a reference source and wavelength division multiplexer, and the measured value can be used to adjust the scale factor or other operating parameter of the gyroscope during operation. Because these techniques seek to compensate the output of the gyroscope rather than to finely control the operation of the light source, the techniques described herein can be used to create optical sensors that are less complex and/or that have improved operating parameters in comparison to prior art sensors.

Various embodiments of an exemplary fiber optic gyroscope apparatus suitably include an optical portion, a wavelength calibration portion and an electronic portion. The optical portion suitably includes a sensor light source configured to produce light that propagates in a coil of optical fiber. The wavelength calibration portion includes a reference light source and a wavelength division multiplexer that provides a first and a second multiplexer output in response to light received at an input. The electronic portion suitably includes any circuitry, software instructions and/or other logic configured to receive indicia of the first and second multiplexer outputs for each of the sensor light source and the reference light source, to compute a wavelength of the light produced by the sensor light source as a function of the received indicia, and to adjust the sensor output in response to the computed shift in wavelength.

Various methods of calibrating a fiber optic gyroscope to compensate for fluctuations in source light wavelength are also provided. According to several embodiments, the wavelength of the source light is accurately determined by obtaining wavelength indicia for light produced by the sensor light source and by a reference light source. The wavelength indicia may include normalized power values, such as sum and difference indicia, obtained from two outputs of a wavelength division multiplexer. Such information can be used to determine any change in the wavelength of light produced by the sensor light source, and to adjust a scale factor or other operating parameter of the gyroscope to adjust the gyro output as a function of the determined wavelength.

Other embodiments include other systems, devices, and techniques incorporating various concepts described herein. Additional detail about several exemplary embodiments is set forth below.

BRIEF DESCRIPTION OF THE DRAWINGS

The present invention will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

As noted above, the mean wavelength of light propagating in a fiber optic gyroscope (FOG) can change in response to temperature fluctuations, radiation and/or other environmental effects, thereby potentially causing error in the measured rate of rotation. FOGs have traditionally avoided wavelength fluctuations by carefully controlling the operation of the light source, a process that has typically been highly sensitive to the mean wavelength of optical sensors, as well as to the total light intensity of the light produced and to the responsivity of the photodiodes used in the gyroscope. In particular, some current gyroscope designs compensate for wavelength fluctuations by using servo controls or the like to modulate the pump current provided to a fiber light source to thereby modulate the intensity and wavelength of light produced. U.S. Pat. No. 5,684,590 and U.S. patent application Ser. No. 10/786,143, for example, describe techniques for controlling the wavelength of light produced by a FOG light source, although other techniques have been used as well. U.S. Pat.

No. 6,744,793 similarly shows a technique for stabilizing a broadband light source using conventional feedback and control techniques.

In contrast to prior art schemes that relied upon precise control of a broadband source, the need to control the center wavelength of a sensor light source is reduced or eliminated by simply measuring the wavelength of light received from the light source and then compensating the output of the FOG sensor to account for any observed wavelength variations. Wavelength measurement can occur using any convenient technique. In various embodiments, for example, a wavelength division multiplexer (WDM) separates received light into two output components that can be further processed to ascertain a variation of the input light from a center wavelength of the multiplexer. By providing light from the sensor light source and from a reference light source to the WDM, variations in source light wavelength can be determined. These variations, in turn, can be used to adjust the scale factor of the gyroscope and/or to otherwise adjust the sensor output of the FOG as appropriate. Because wavelength fluctuations are observed and compensated, the need to precisely control the source wavelength is reduced significantly or eliminated, thereby simplifying the design of the gyroscope and improving the range of wavelength drift over which the gyroscope can be operated.

Figure 1:
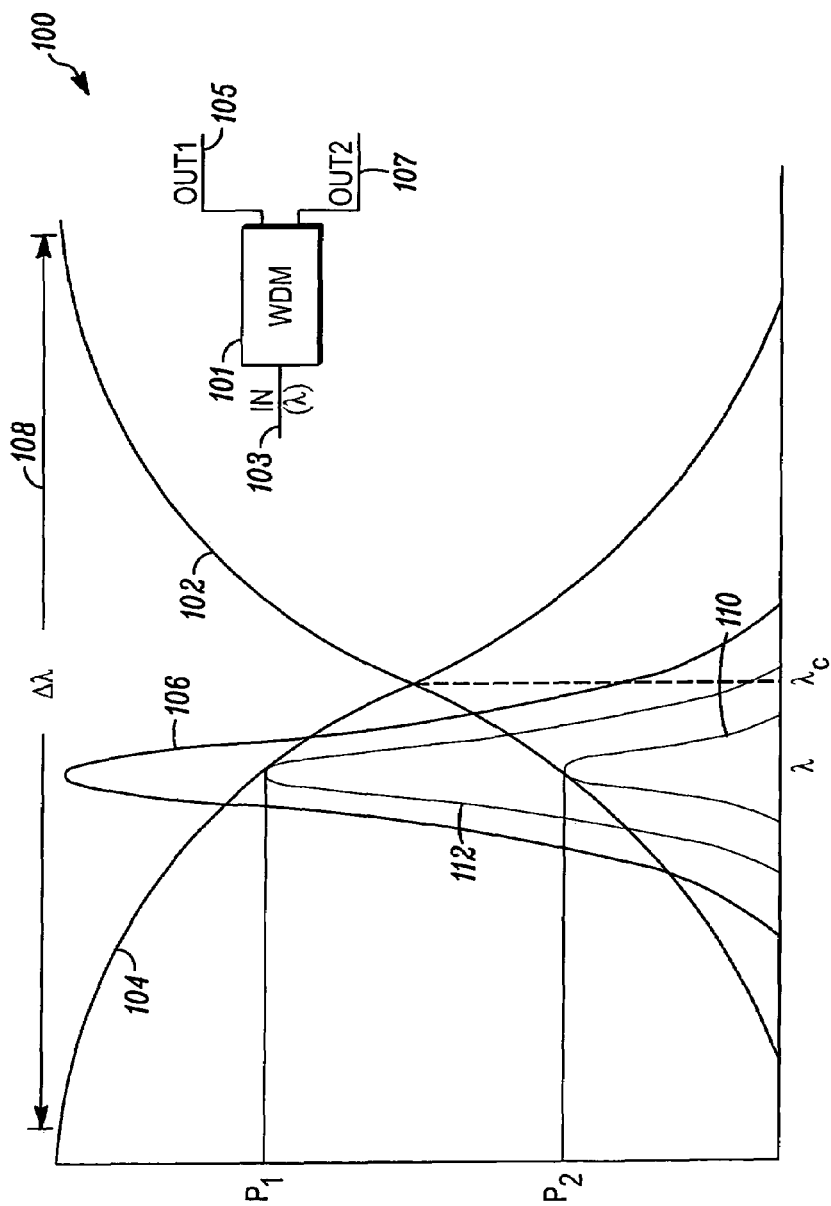
FIG. 1 is a plot showing the transfer characteristics of an exemplary wavelength division multiplexer.

FIG. 1 illustrates one principal of operation exploited within various exemplary embodiments. With reference now to FIG. 1, an exemplary transfer characteristic 100 of a wavelength division multiplexer (WDM) 101 appropriately directs received input light received at one or more inputs 103 toward one or more output paths 105, 107 as a function of the wavelength (or frequency) of the input light. The particular WDM characteristic 100 shown in FIG. 1, for example, effectively combines a "long wavelength pass" function 102 on one output 105 with a "short wavelength pass" function 104 provided on a second output 107. That is, light having a wavelength greater than a "center" wavelength ($\lambda_c$) is directed toward a first output 105, and light having a wavelength less than the center wavelength is directed toward a second output 107, as described more fully below. The characteristics of the particular WDM 101 may vary from embodiment to embodiment. In a conventional WDM 101, for example, the channel separation may be on the order of tens to hundreds of nanometers, and may be centered around a wavelength of approximately 1250 nm or so, particularly when WDM 101 is intended to separate the laser diode light at 980 nm from the 1500-1550 nm light 103 that originally emanated from erbium doped fiber. In other embodiments, however, the particular wavelengths and characteristics of the WDM may vary significantly depending upon the particular characteristics of input and output light, and/or other factors as appropriate. In thin-film WDMs, for example, non-sinusoidal transfer functions can occur that differ from the raised cosine function shown in FIG. 1.

In a typical WDM 101, some separation ($\Delta\lambda$) exists between the longer- and shorter-wave wavelengths provided to outputs 105 and 107, respectfully. Input light wavelengths falling within this channel separation range of the WDM center wavelength, then, can be attenuated and/or provided to multiple outputs 105, 107 in accordance with the filter characteristics 100 of the WDM. Input spectrum 106 shown in FIG. 1, for example, has an average wavelength ($\lambda$) that lies relatively close to the center wavelength of the WDM, thereby resulting in output spectra 110 and 112 being produced at outputs 105 and 107, respectively.

By comparing the relative intensity of the spectra 110, 112 produced at each output 105, 107, the wavelength of the input spectrum 106 can be ascertained. In particular, the normalized difference in output power ($\Delta P_{norm}$) between the two resulting spectra 110 and 112 is known to indicate the wavelength of input light. The normalized difference is defined as a ratio of the "sum" and "difference" of the spectra emanating from WDM 101. More particularly, the relationship between normalized difference in output power and input light wavelength ($\lambda$) may be expressed algebraically as:

$$\Delta P_{norm} = \frac{P_1 - P_2}{P_1 + P_2} = \frac{-\pi}{\Delta\lambda}(\lambda - \lambda_c) \quad (1)$$

wherein $P_1$ and $P_2$ are proportional to the intensities of the light received at each output 107, 105 of WDM 101, respectively. As can be seen from this relationship, the normalized difference in power of the two output spectra 110, 112 increases as the wavelength of the input spectrum 106 drifts away from the center wavelength of WDM 101. Equation 1 is a linear approximation of the raised cosine function shown in FIG. 1, so other embodiments may be represented by other mathematical relationships as appropriate.

While this relationship could be used to deduce the wavelength ($\lambda$) of the input light 106 directly based upon known properties (e.g. $\lambda_c$ and $\Delta\lambda$) of WDM 101, in practice the center wavelength of WDM 101 can drift over time or in response to environmental effects such as radiation or changes in temperature. If the normalized difference in output power produced by the sensor light source is compared to the normalized difference in output power produced by an accurate reference source, however, fluctuations in the central wavelength are effectively removed from the resulting comparison. Stated algebraically:

$$\Delta P = \Delta P_{S.L.S} - \Delta P_{ref.L.S} = \frac{-\pi}{\Delta\lambda}(\lambda - \lambda_c) - \frac{-\pi}{\Delta\lambda}(\lambda_{ref} - \lambda_c) = \frac{-\pi}{\Delta\lambda}(\lambda - \lambda_{ref}) \quad (2)$$

wherein $\Delta P_{S.L.S.}$ and $\Delta P_{ref.L.S.}$ are the normalized differences in output power produced by light emanating from the sensor light source and from the reference source, respectively, and wherein $\lambda_{ref}$ represents the wavelength of light produced by the reference light source. From equation 2 above, it can be readily shown that the wavelength of the input light can be determined solely from the comparison of normalized differences in output power. Stated algebraically:

$$\lambda = \frac{\Delta P \Delta\lambda}{\pi} - \lambda_{ref} \quad (3)$$

Exploiting the relationship of Equation 3, then, the wavelength of light input from a sensor light source can be determined relatively accurately. By providing an accurate reference source and simply observing the intensities of light emanating from WDM 101, the wavelength of light propagating in a FOG can be readily determined.

Moreover, the accurately-determined value of the sensor-light wavelength can be used to adjust a scale factor or other operating parameter of the gyroscope to improve the accuracy of the sensor output. In a conventional rate gyroscope that provides an output indicative of a rate of rotation, for example, the scale factor relationship between the observed variation in the phase of the counter-rotating beams (Δφ) and the rate of rotation (Ω) is known to be represented by the relationship:

$$\Delta\phi = \frac{2\pi LD}{\lambda c}\Omega \quad (4)$$

wherein L is the length of optical fiber in the fiber coil, D is the diameter of the coil, and c is the speed of light.

As a result, the cost, complexity and inherent inaccuracy that results from controlling the wavelength of light produced by a fiber light source can be reduced or eliminated by accurately measuring the wavelength of the light and then computationally adjusting the output in response to any measured variations. This adjustment may be made in hardware or software already present within many gyroscope designs, and therefore is relatively inexpensive in terms of material requirements. Moreover, the range over which the wavelength may be measured and compensated may be significantly larger (e.g. by a factor of ten or more) than the wavelength range that could be accurately controlled in many prior designs. As a result, many of the techniques described herein may result in significant performance improvements as well as reductions in complexity.

Figure 2:
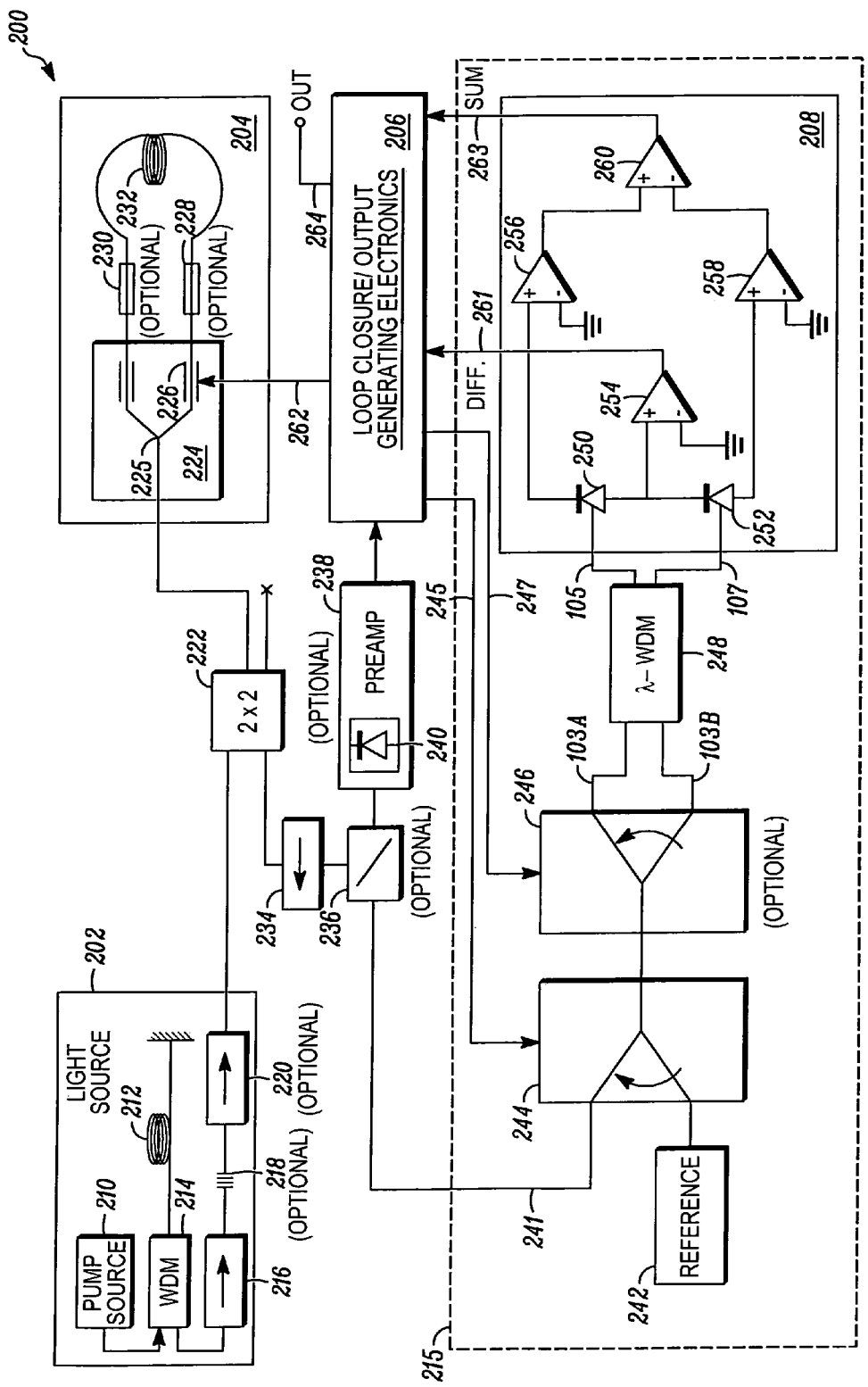
FIG. 2 is a block diagram of an exemplary fiber optic rotation sensor capable of responding to variations in source wavelength.

Turning now to FIG. 2, an exemplary fiber optic gyroscope 200 capable of measuring and compensating for wavelength variations includes a sensor light source 202 that provides light to a sensing loop assembly 204 as appropriate. In various embodiments, light source 202 is connected to assembly 204 via an optical coupler 222 (e.g. a conventional 2×2 power splitter) that also provides output light from optical assembly 204 to a pre-amplifier 238 or other appropriate sensor circuitry capable of detecting light received from optical assembly 204. The sensed signals are then processed by electronics 206 to generate sensor output signal 264, as well as any loop closure or other modulation signals 262 used during gyro operation. Conventional interferometric and resonator FOG operation and components are described in various references, including U.S. Pat. No. 5,999,304, although many variations may be made from the particular structures and techniques described therein. In addition to conventional gyroscope features, a wavelength calibration module 215 may be provided to measure the wavelength of light produced by sensor light source 202, and to provide indicia of the wavelength to electronics 206 to allow for computation and/or adjustment of output signals 264 using the concepts set forth above.

Sensor light source 202 is any device or system capable of providing light to sensing loop assembly 204. In various embodiments, sensor light source 202 includes an optical fiber 212, glass substrate or other material doped with erbium or other materials to generate light of an appropriate wavelength. In a conventional implementation, a diode or other pump source 210 provides "pump" radiation at an appropriate wavelength to optically excite the dopant atoms present within fiber 212. In the case of erbium doped fiber 212, for example, pump source 210 typically provides pump radiation of about 980 and 1480 nm to produce source light having a wavelength of about 1500-1550 nm or so, although other parameters could be used in various equivalent embodiments. Light from pump source 210 is conventionally coupled to doped fiber 212 using any appropriate coupler, such as a wavelength division multiplexer 214 that also provides source light from doped fiber 212 toward a light source output. Source light may also be protected from backscatter (e.g. by isolators 216, 220), filtered (e.g. by grating 218 or the like) or otherwise processed as appropriate, although the particular tolerances of gratings 218 or the like can be reduced by the use of wavelength calibration, thereby reducing or eliminating the need for such structures in many embodiments. In other embodiments, light source 202 is implemented with a superluminescent diode (SLD) or any other broadband light source as appropriate.

Sensing loop assembly 204 is any component or system capable of producing a phase shift in two counter-rotating beams in accordance with the Sagnac effect or the like. In various exemplary embodiments, sensing loop assembly 204 suitably includes an integrated optics chip (IOC) 224 coupled to an optical coil 232. Alternatively, IOC 224 may be replaced by one or more discrete components such as splitters, couplers, depolarizers and/or the like.

IOC 224 typically includes a Y-junction or other splitter 225 capable of splitting source light into two separate beams and then re-combining the beams upon exit from coil 232. IOC 224 also includes one or more phase modulators 226 capable of inducing phase changes between the counter-rotating beams in response to modulation signals 262 generated by electronics 206, and/or in response to other factors as appropriate. In many embodiments, a modulator 226 is provided on each leg of the light path extending from splitter 225 toward coil 232 so that light can be modulated upon both entering and exiting coil 232. IOC 224 may also include any number of polarizers, depolarizers, gratings, filters and/or other features as appropriate.

Optical coil 232 is typically a length of optical fiber (e.g. on the order of 100-500 meters or so) that is wound to a coil of convenient diameter, often on the order of five to ten centimeters or so. As noted above, light from source 202 counter-propagates in coil 232 to produce phase changes that indicate rotation of sensor 200. In some embodiments, light entering and exiting coil 232 may be depolarized, as appropriate, by depolarizers 228 and 230, although other sensors 200 operating under different parameters may not require or include such features.

In operation, then, light from sensor light source 202 is provided to sensing loop assembly 204, which suitably splits the light into two counter-rotating beams, provides both beams to opposite ends of optical coil 232, modulates incoming and outgoing light as appropriate, and re-combines the two beams into a common signal for subsequent processing. Light output from sensing loop assembly 204 may be provided (e.g. via coupler 222 as shown) to one or more photodetectors 240 that are capable of sensing the light and of producing a digital or analog electrical signal in response thereto. In various embodiments, photodetector 240 is implemented as one or more photodiodes within an amplifier circuit 238. In the embodiment shown in FIG. 2, for example, light from sensing loop assembly 204 is divided (by splitter 236) between photodetector 240 and wavelength calibration module 215. Alternatively, splitter 236 and amplifier circuit 238 may be eliminated or modified, and the output of sensing loop assembly 204 may be obtained from signals produced within wavelength calibration module 215 as appropriate.

Wavelength calibration module 215 suitably includes a reference light source 242, one or more optical switches 244, 246, a wavelength division multiplexer (WDM) 248, and appropriate circuitry 208 for detecting and/or processing the optical outputs 105, 107 from WDM 248. As noted above in conjunction with FIG. 1, the mean wavelength of light exiting sensing loop 204 can be determined from outputs 105, 107 of WDM 248 obtained from measurements of light from both the gyro (e.g. from signal path 241) and from reference light source 242.

Reference light source 242 is any light source component or system capable of providing light having a relatively unvarying wavelength. In various embodiments, light source 242 suitably includes a distributed feedback laser (DFB) or the like locked onto an absorption line from an acetylene reference cell or similar molecular reference. The DFB typically includes a luminescent or super-luminescent diode with a Bragg grating or the like provided to enhance a single horizontal mode of light produced. Because acetylene is the National Institute of Standards and Technology (NIST) molecular reference for absorption in the 1510-1540 nm calibration range, the combination of a DFB and acetylene line are capable of providing a highly accurate and stable source of light. Other structures, materials and arrangements, however, could be used across a wide array of alternate embodiments to provide stable reference light or any desired wavelength or other properties. An accurate reference source may be readily fabricated using a fiber Bragg grating, for example, rather than an acetylene line. Again, any reference light source 242 capable of providing a relatively stable mean wavelength could be used in any number of alternate but equivalent embodiments.

To accommodate light originating from sensor light source 202 and from reference light source 242, one or more optical switches 244, 246 are provided. Each of these switches are responsive to control signals 245, 247 (respectively) produced by electronics 206 or another appropriate source to alternately provide light from the two sources as appropriate. While two optical switches are not necessary to accomplish this task, it has been identified in practice that the addition of a second switch 246 can be beneficial in reducing measurement error due to photodetector responsivities. That is, by alternating the position of switch 246 and averaging results obtained in each position over time (e.g. in electronics 206), the accuracy of results can be dramatically improved. While the second optical switch 246 is optional for many embodiments, then, benefits obtained from the addition of switch 246 may be significant.

WDM 248 is any optical device capable of multiplexing, filtering or otherwise handling incoming light 103 in a manner that allows the wavelength of the light to be determined from one or more output components 105, 107. In various embodiments, WDM 248 is a conventional wavelength division multiplexer that has a center wavelength ($\lambda_c$) that approximates (e.g. within about 10-20 nm or so) the desired wavelength of the sensor source light and/or the wavelength of the reference light, and that has a channel separation ($\Delta\lambda$) that is wide enough to provide the level of resolution desired. Generally speaking, WDMs 248 with narrower channel spacings provide better sensitivity, while wider channel spacings provide better linearity. In an exemplary embodiment that calibrates light produced from an erbium doped fiber, for example, WDM 248 may have a center wavelength of about 1550 nm and a channel separation of about 100-200 nm or so, although other embodiments may have widely varying parameters. In the exemplary embodiment shown in FIG. 2, WDM 248 includes two input ports 130A-B coupled to switch 246, although alternate embodiments in which a single switch 244 is provided could provide the single switch output to a single WDM input 130, or to any available input of a multi-input WDM 248. Examples of additional wavelength division multiplexers can be found in United States Patent Publication 2004/0151424A1.

Light received on any input 103A-B of WDM 248 is appropriately provided on one or more outputs 105, 107 as appropriate. In various embodiments, WDM 248 has a transfer characteristic similar to that shown in FIG. 1, wherein light having a wavelength below a center wavelength ($\lambda_c$) of WDM 248 is directed toward one output 107 and light having a wavelength above the central wavelength is directed toward another output 105. In such embodiments, light approximately equal to the center wavelength of WDM 248 is split and provided on each of the two outputs 105, 107, with a relative power/intensity that is representative of the difference between the wavelength of the light and the center wavelength, as described above.

The relative outputs 105, 107 of WDM 248 are appropriately detected by optical detecting circuitry 208, which suitably receives optical signals 105, 107 and provides corresponding "sum", "difference" and/or other appropriate indicia 261, 263. In various embodiments, circuitry 208 is any opto-electrical circuit capable of providing indicia 261, 263 to electronics 206 for subsequent processing. In the embodiment shown in FIG. 2, for example, circuitry 208 includes a photodiode 250, 252 corresponding to each optical output 105, 107 of WDM 248. Each photodiode 250, 252 provides a voltage between the two diode terminals that is proportional to the intensity (or power) of the light received. By processing the voltages across the photodiodes 250, 252, then, appropriate indicia 261, 263 can be generated to represent the relative outputs of WDM 248. In a simple embodiment, for example, indicia 261 may simply provide analog voltages representing the voltages across photodiodes 250, 252. These voltages, in turn, may be digitized and/or otherwise processed as appropriate within electronics 206.

In the embodiment shown in FIG. 2, however, photodiodes 250, 252 are connected to an electrical network that includes several operational amplifiers 254, 256, 258, 260 for comparing, adjusting or otherwise processing the voltages provided across photodiodes 250 and 252. Each of the op amps 254, 256, 258, 260 are appropriately configured as difference amplifiers, with the output of each amplifier representing the difference between the two input voltages. Although bias resistors and other circuitry have been removed from circuit 208 in FIG. 2 for clarity and ease of understanding, such a circuit is readily fabricated from standard components to provide the operating characteristics desired in particular embodiments. Amplifier 254, for example, is readily configured to provide a difference signal 261 that is indicative of the voltage difference between diodes 250 and 252, with amplifier 260 indicating a sum of the two voltages as signal 263. These "sum" and "difference" indications 261, 263 can be readily digitized, stored and/or otherwise processed in electronics 206 to determine the wavelength of light provided to WDM 248 using the concepts set forth above.

Referring back to the discussion above, for example, the "difference" indication 261 could represent the numerator of Equation 1, with the "sum" indication 263 representing the denominator. By computing the ratio of indications 261 to 263, then, the normalized difference in output power ($\Delta P$) between the two optical outputs 105 and 107 of WDM 148 can be readily ascertained. Further, by intermittently providing light from sensor light source 202 and reference light source 242 using switch 244, the normalized difference in output power for both light sources can be obtained. If the mean wavelength of reference source 242 is accurately known, then, wavelength of the source light can be determined by subtracting the normalized difference in output power for reference source 242 from the normalized difference in the output power of sensor source 202, in accordance with Equations 2 and 3 above.

The wavelength calculations can be processed optically, electrically, electronically, or in any other manner. Circuitry 208, for example, could be augmented or modified to compute the wavelength (or the normalized difference) using conventional analog design techniques. Similarly, indicia 261 and 263 could be combined or modified in a wide array of alternate embodiments to provide raw output of photodiodes 250, 252, to provide other derived parameters, or to simply provide the normalized difference in output power directly. In still other embodiments, circuitry 208 is combined with analog-to-digital conversion (ADC) circuitry to allow digital processing of outputs 105 and 107.

As noted above, electronics 206 represent any components, logic or systems capable of processing data as described herein. In various embodiments, electronics 206 include any type of microprocessor, microcontroller, digital signal processor (DSP), programmable integrated circuit, programmable gate array (e.g. a field programmable gate array (FPGA)) and/or the like. As such, the particular logic and other features described herein may be implemented in any type of hardware, software, firmware or other logic. Various embodiments, for example, include a digital processing circuit with associated memory capable of storing data and instructions to carry out the tasks described herein. Other embodiments implement the various functions in hardware or other logic, or in any combination of hardware, software or firmware logic as appropriate.

In operation, then, the FOG sensor 200 shown in FIG. 2 allows light from a sensor light source 202 to propagate through sensing loop assembly 204 before being detected at a photodetector 240. Light originally produced from sensor light source 202 is provided to wavelength calibration module 215, which ultimately provides both light 241 from the sensing coil and light from reference source 242 to WDM 248. WDM 248 in turn produces optical indicia 105, 107 that can be further processed to determine the wavelength of the source light. WDM outputs 105, 107 are shown processed by circuitry 208, which provides a "sum" indication 263 and a "difference" indication 261 that can be used to ascertain normalized power differences observed for both source and reference light, which in turn can be used to determine the wavelength of light propagating in sensing loop assembly 204. Sensor electronics 206, which appropriately receive indicia of the light received at detector 240, are able to compensate the outputs 264 of sensor 200 in response to the indicia 261, 263 received from the wavelength calibration module 215.

Alternate embodiments may be arranged according to various other physical or logical layouts. Splitter 236 and preamplifier circuitry 238 may be eliminated, for example, or combined with wavelength calibration module 215 and/or electronics 206 to provide a single light path for wavelength calibration and sensor output determination. Further, optical switch 246 may be eliminated in various embodiments, as described above. In still other embodiments, the particular technique used to compute the wavelength of source light is modified, thereby allowing for different indicia 261, 263 that may be representative of other qualities of light received at WDM 248. In still other embodiments, the wavelength of light propagating in sensing loop assembly 204 may not be expressly determined; instead, such a calculation may take place implicitly using, for example, the relationship of Equation 4 in conjunction with the raw data obtained and/or digitized from wavelength calibration module 215. That is, logically combining equations 3 and 4 to adjust a gyro scale factor or similar quantity in response to observed variations in source and/or reference light should be considered as an equivalent to computing the wavelength of source light, even though it may not be necessary to explicitly compute the particular value of the wavelength ($\lambda$) in every such instance or embodiment.

Figure 3:
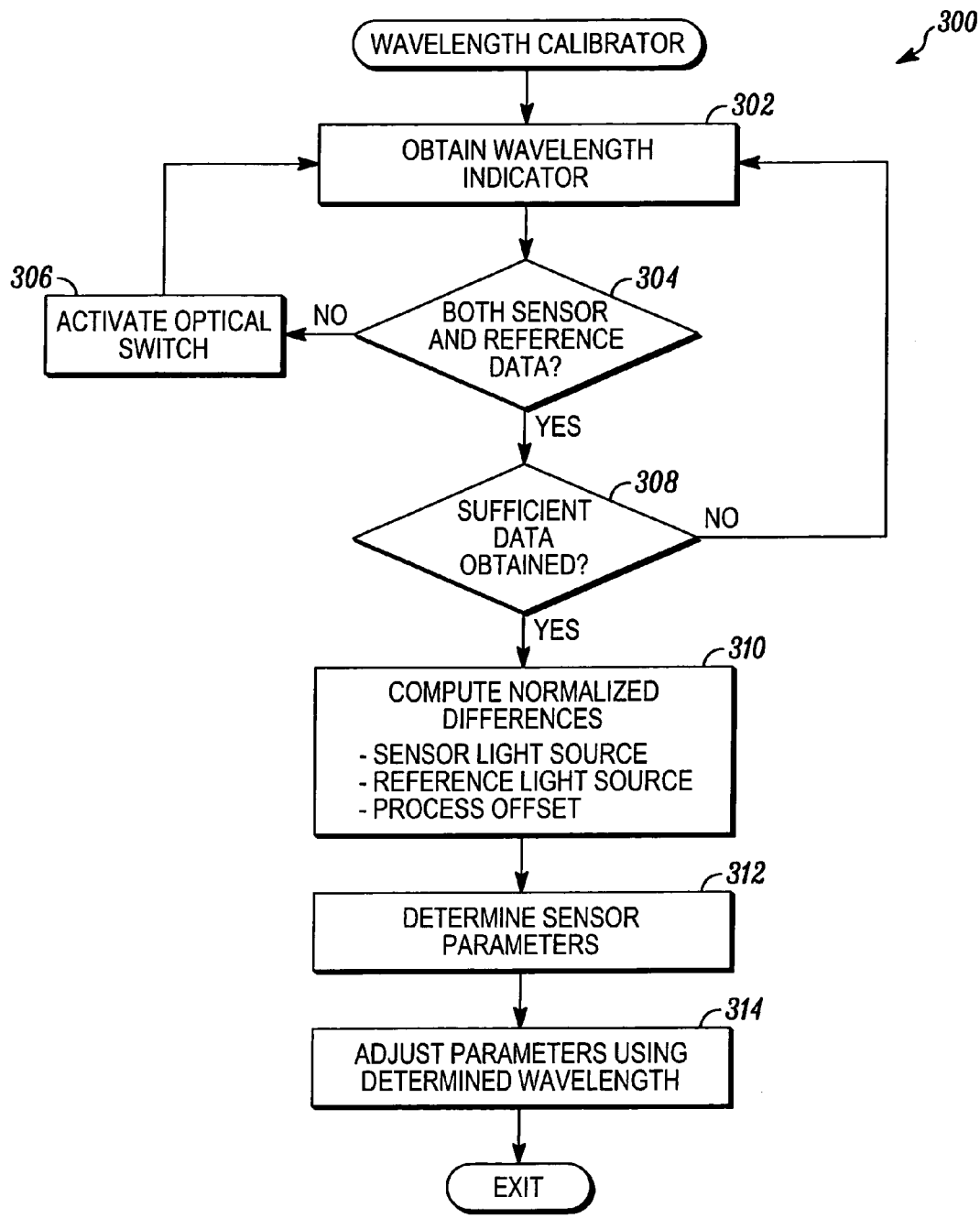
FIG. 3 is a flowchart showing an exemplary technique for calibrating a fiber optic gyroscope.

With final reference now to FIG. 3, an exemplary process 300 for calibrating a fiber optic sensor (e.g. sensor 200 in FIG. 2) suitably includes the broad steps of obtaining indicia of light wavelength (step 302), determining the output of the sensor (step 312), and then adjusting one or more sensor operating parameters according to the wavelength indicia received (step 314). The various steps and procedures described in conjunction with FIG. 3 may be executed manually, using a digital computer, and/or may be carried out through analog, optical and/or other techniques as appropriate. In various embodiments, however, process 300 is at least partially implemented using software, firmware or other programming applied to electronics 206 residing within the gyroscopic sensor 200. Other embodiments may be stored on any optical, magnetic, electronic or other storage medium, including any type of memory, disk and/or the like.

From the standpoint of electronics 206, wavelength indicia may be any optical, electrical, digital, analog and/or other signal(s) that contain information relating to the wavelength of light received by WDM 248. Wavelength indicia may correspond to sum and difference indicia (e.g. signals 263, 261 in FIG. 2), for example, or may correspond to any other information as appropriate. As described above, it is typically desirable to obtain wavelength indicia corresponding to light produced by sensor light source 202 and by reference source 242 (step 304). In various embodiments, switch 244 is toggled (step 306) periodically and/or in response to a control signal (e.g. signal 245) as appropriate to place light from each source onto a single optical path. In other embodiments, two separate optical paths could be provided, although this would typically involve additional components and may complicate operation of sensor 200.

Although not strictly necessary in all embodiments, it may be desirable in practice to obtain data over at least several operating cycles (step 308), with the results of the multiple observations averaged over time. This averaging allows for ready compensation for modulation signals 262 applied to sensing loop assembly 204, for example, and may reduce other sources of error as well. Additionally, various embodiments that include a second optical switch (e.g. switch 246 in FIG. 2) will cycle that switch to apply optical signals to multiple inputs of WDM 248. Switch 246 may be cycled periodically, in response to control signal 247, or according to any other scheme, with resulting outputs being averaged over time, to reduce erroneous effects relating to the responsivities of photodetectors 250 and 252.

When sufficient data has been gathered, wavelength calibration can continue (step 310). The various indicia received in step 302 may be appropriately digitized, stored, filtered and/or otherwise processed as appropriate. Various embodiments may additionally subtract an offset value from the received or stored indicia (or any values calculated therefrom) to reduce effects of backscatter or other sources of reproducible error in the gyro. Such an offset may be calculated or observed during gyro operation, and can be processed using electronics 206 as appropriate. If offsets are not appropriately taken into account, then an intensity sensitivity in the wavelength measurement can arise. Further, normalized differences in output power ($\Delta P$) can be readily calculated for both the source and the reference light source using the concepts set forth above (e.g. in conjunction with Equation 2), and the wavelength (λ) of the source light may be explicitly or implicitly calculated using Equation 3 or the like. Again, it may not be necessary to expressly calculate the particular values for wavelengths if the relationships described herein are used to equate WDM outputs to outputs 264 of sensor 200.

Sensor parameters used in computing output signal 264 may be determined in any manner (step 312). In various embodiments, electronics 206 receive digitized representations of light propagating in sensing loop assembly 204, and use these representations to determine phase shifts between the counter-rotating beams. These phase shifts, in turn, are related to the rate of sensor rotation by a scale factor.

By adjusting the scale factor or other operating parameter of sensor 200 in response to wavelength indicia received from WDM 248 (step 314), the overall performance of the sensor 200 can be improved. Equation 4 provides an example of a relationship between observed data and the sensor output that is at least partially dependent upon the wavelength of light propagating in sensing loop assembly 204. By adjusting this relationship using the accurately-determined value of the source light wavelength, the accuracy of sensor output 264 can be maintained even though the wavelength may drift over time or in response to environmental effects.

Process 300 may be executed at any time during gyro operation and/or can be repeated at any periodic, aperiodic or other interval. In other embodiments, calibration process 300 is performed in response to a radiation or other event that creates abnormal effects upon the gyroscope. Switch 244 will typically be returned to the state wherein light 241 received from sensing loop assembly 204 is provided to WDM 248 after process 300 is complete.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. Various changes may therefore be made in the function and arrangement of elements described in the exemplary embodiments without departing from the scope of the invention as set forth in the appended claims and their legal equivalents.

What is claimed is:

1. A method of operating a fiber optic gyroscope providing an output, the method comprising the steps of:
    obtaining indicia of a sum and a difference between a first and a second outputs of a wavelength division multiplexer for each of a sensor light source and a reference light source;
    averaging the indicia over a period of time;
    determining a wavelength of light produced by the sensor light source as a function of the averaged indicia; and
    compensating the output of the fiber optic gyroscope as a function of the determined wavelength.

2. The method of claim 1 wherein the compensating step comprises adjusting a scale factor used in computing the output of the fiber optic gyroscope.

3. The method of claim 1 wherein the wavelength determining step comprises the steps of determining normalized power differences between the sum indicia and the difference indicia for each of the sensor light source and the reference light source.

4. The method of claim 3 wherein the wavelength determining step further comprises determining a difference between the normalized power difference of the sensor light source and the normalized power difference of the reference light source.

5. The method of claim 1 further comprising the step of actuating a first optical switch to alternately provide the light from the sensor light source and light from the reference light source to the wavelength division multiplexer.

6. The method of claim 5 further comprising the step of actuating a second optical switch to alternately provide light to a first input and a second input of the wavelength division multiplexer.

7. The method of claim 1 wherein the period of time corresponds to a period of a modulation signal.

8. The method of claim 1 further comprising the step of adjusting a modulation signal applied to the fiber optic gyroscope in response to the indicia.

9. The method of claim 1 further comprising the step of subtracting an offset value from the indicia.

10. A digital storage medium having executable instructions stored thereon configured to execute the method of claim 1.

11. A fiber optic gyroscope comprising:
    means for obtaining wavelength indicia from the outputs of a wavelength division multiplexer for each of a sensor light source and a reference light source during operating of the fiber optic gyroscope;
    means for averaging the wavelength indicia over a period of time;
    means for determining an output signal from the fiber optic gyroscope; and
    means for adjusting the output signal as a function of the averaged wavelength indicia.

12. The fiber optic gyroscope of claim 11 wherein the wavelength indicia comprise sum and difference indicia representing first and second outputs of the wavelength division multiplexer for each of the sensor light source and the reference light source.

13. A fiber optic gyroscope configured to provide a sensor output that is indicative of a rate of rotation, the fiber optic gyroscope comprising:
    an optical portion comprising a sensor light source and a coil of optical fiber, wherein the sensor light source is configured to produce light that propagates in the coil of optical fiber;
    a wavelength calibration portion coupled to the the optical portion, the wavelength calibration portion comprising;
    a reference light source;
    a wavelength division multiplexer having a first and a second multiplexer output; and
    a first optical switch coupled to the optical portion, the reference light source and the wavelength division multiplexer, wherein the first optical switch is configured to alternately provide light from the sensor light source and the reference light source to the wavelength division multiplexer; and
    an electronic portion configured to receive indicia of the first and second multiplexer outputs for each of the sensor light source and the reference light source, to compute a wavelength of the light produced by the sensor light source as a function of the received indicia, and to adjust the sensor output as a function of the computed wavelength.

14. The fiber optic gyroscope of claim 13 wherein the electronic portion comprises at least one of the group consisting of a microprocessor, a microcontroller, a field programmable gate array (FPGA) and a digital signal processor (DSP).

15. The fiber optic gyroscope of claim 13 further comprising a second optical switch configured to alternately provide light to a first input and a second input of the wavelength division multiplexer.

16. The fiber optic gyroscope of claim 13 further comprising a detector circuit comprising a first photodiode and a second photodiode in proximity to the first and second multiplexer outputs, respectively.

17. The fiber optic gyroscope of claim 16 wherein the detector circuit further comprises a plurality of amplifiers electrically coupled to the first and second photodiodes to thereby provide the indicia of the first and second multiplexer outputs.

18. The fiber optic gyroscope of claim 17 wherein the indicia comprise representations of a sum and a difference of the voltages across the first and second photodiodes.

* * * * *